(12) United States Patent
Minter et al.

(10) Patent No.: US 9,977,941 B2
(45) Date of Patent: May 22, 2018

(54) BARCODE SCANNER ILLUMINATION

(71) Applicant: NCR Corporation, Duluth, GA (US)

(72) Inventors: Joshua Minter, Atlanta, GA (US); Mark Allen Rambler, Decatur, GA (US)

(73) Assignee: NCR Corporation, Atlanta, GA (US)

(*) Notice: Subject to any disclaimer, the term of this patent is extended or adjusted under 35 U.S.C. 154(b) by 0 days. days.

(21) Appl. No.: 15/223,612

(22) Filed: Jul. 29, 2016

(65) Prior Publication Data

US 2018/0032775 A1    Feb. 1, 2018

(51) Int. Cl.
*G06K 7/10* (2006.01)
*G06K 19/06* (2006.01)

(52) U.S. Cl.
CPC ...... *G06K 7/10742* (2013.01); *G06K 7/10811* (2013.01); *G06K 7/10831* (2013.01); *G06K 19/06028* (2013.01)

(58) Field of Classification Search
USPC .... 235/462.42, 462.26, 462.13, 462.45, 383, 235/488; 705/7.42; 700/225
See application file for complete search history.

(56) References Cited

U.S. PATENT DOCUMENTS

| | | | | |
|---|---|---|---|---|
| 5,118,930 A * | 6/1992 | Takada | ............... | G06K 19/02 235/488 |
| 7,546,953 B1 | 6/2009 | Collins | | |
| 7,821,639 B2 * | 10/2010 | Ehbets | ............... | G01J 3/02 235/462.04 |
| 8,479,997 B2 | 7/2013 | Barkan et al. | | |
| 8,678,274 B1 | 3/2014 | Madej | | |
| 8,757,494 B2 | 6/2014 | Vinogradov | | |
| 2003/0111537 A1 * | 6/2003 | Tien | ............... | G06K 7/10732 235/462.45 |
| 2007/0040035 A1 * | 2/2007 | Kotlarsky | ............... | G06K 7/10683 235/462.45 |
| 2007/0095919 A1 * | 5/2007 | Detwiler | ............... | G02B 26/12 235/462.39 |
| 2008/0142597 A1 | 6/2008 | Joseph et al. | | |
| 2010/0139989 A1 * | 6/2010 | Atwater | ............... | G01G 19/4144 177/245 |
| 2012/0150589 A1 * | 6/2012 | Xian | ............... | G06K 7/10128 705/7.42 |
| 2013/0126618 A1 * | 5/2013 | Gao | ............... | G06K 7/10 235/469 |
| 2013/0175343 A1 * | 7/2013 | Good | ............... | G06K 7/10564 235/462.32 |
| 2014/0343719 A1 * | 11/2014 | Collombet | ............... | G06K 19/00 700/225 |
| 2015/0060549 A1 * | 3/2015 | Hirono | ............... | G06K 7/10851 235/462.26 |
| 2016/0255341 A1 * | 9/2016 | Mateti | ............... | G06T 5/006 348/187 |

OTHER PUBLICATIONS

European Search Report dated Nov. 28, 2017 in co-pending European Patent Application 17183096.1.

* cited by examiner

*Primary Examiner* — Allyson Trail

(74) *Attorney, Agent, or Firm* — Schwegman, Lundberg & Woessner

(57) ABSTRACT

Disclosed is a barcode scanner. The barcode scanner can include a scanning tower and a first reflector. The scanning tower can define a scanning window. The first reflector can be located within the scanning tower proximate an illumination source. The first reflector can be configured to redirect light towards into a scanning volume.

16 Claims, 4 Drawing Sheets

BARCODE SCANNER ILLUMINATION

BACKGROUND

Service terminals have become ubiquitous within the retail environment. At the retail level, service terminals can include self-service terminals (SST) and cashier service terminals. Service terminals allow customers to quickly checkout by allowing the customer or a cashier to scan items having a barcode. The items are scanned by moving items quickly over a scanner.

SUMMARY

Disclosed is a barcode scanner. The barcode scanner can include a scanning tower and a first reflector. The scanning tower can define a scanning window. The first reflector can be located within the scanning tower proximate an illumination source. The first reflector can be configured to redirect light towards into a scanning volume.

BRIEF DESCRIPTION OF THE FIGURES

The above-mentioned and other features and advantages disclosed herein, and the manner of attaining them, will become more apparent and the disclosure itself will be better understood by reference to the following description of embodiments taken in conjunction with the accompanying drawings, wherein.

Corresponding reference characters indicate corresponding parts throughout the several views. The exemplifications set out herein illustrate embodiments, and such examples are not to be construed as limiting the scope of the appended claims in any manner.

DETAILED DESCRIPTION

Figure 1:
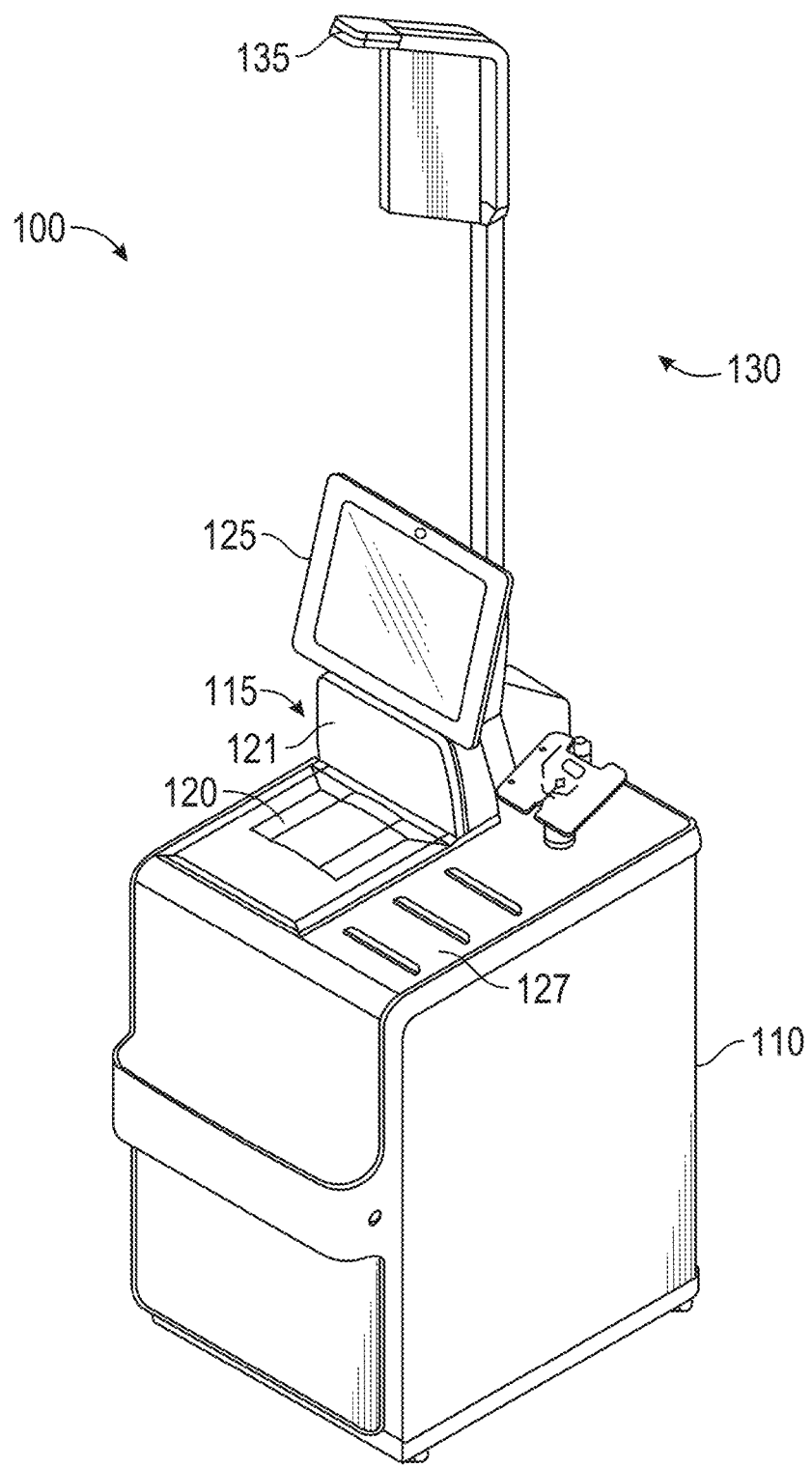
FIG. 1 shows a perspective view of a service terminal according to an example embodiment.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

Barcode scanners are used to increase productivity by allowing people to move items proximate a scanning component of the barcode scanners. The barcode scanners can use a light source that can produce a strobe light. The strobe light can cause a barcode to appear motionless to the scanning component as the item passes the scanning component. However, the strobe light can irritate a user and cause eye fatigue.

To combat fatigue and to soften the light, a reflector can be used redirect a bright light in a fashion that does not appear as bright to the user. The reflector can also include diffusors that can collimate to light. Collimated light can eliminate errant light that may impact a user's eyes and cause fatigue. Disclosed herein are examples of barcode scanners that incorporate reflectors to eliminate hot spots and reduce eye fatigue. These and other embodiments are described in greater detail herein with reference to the figures.

Turning now to the figures, FIG. 1 is a block perspective diagram of a service terminal 100 that includes a housing 110 supporting a barcode scanner indicated generally at 115. Housing 110 may have a rack like structure and may contain circuitry to provide power, processing, card reading, and other functions. In various embodiments, the barcode scanner 115 may include a first scanning window 120 and a second scanning window 121, and a display 125, which may be a touchscreen display that may accept user input. The first scanning window 120, as shown, may be parallel to a working surface 127 of housing 110 and may to facilitate scanning of products to be purchased. Working surface 127 may also be referred to as a top surface. The barcode scanner 115 may also include a card reader that may be used to complete transactions. A marker device 130 may be used to provide indicators to customers, such as via a light 135 having a color representative of a status of a lane that the service terminal 100 is servicing.

The service terminal 100 may be used in an assisted mode where a cashier scans the customer's products and performs other checkout functions. Generally, cashiers may swipe an item over the barcode scanner 115 and a barcode on the item can be read via a scanner located under the first scanning window 120 or behind the second scanning window 121. As described herein, as the item is being swiped over the barcode scanner 115, the area proximate the first scanning window 120 and the second scanning window 121 can be illuminated.

The illumination can be in the form of a strobe sequence. For example, the strobe sequence can include lights that flash in the range of about 60 Hz to about 250 Hz. For instance, the illumination can be caused by light emitting diodes (LEDs) flashing at 80 Hz. The strobe sequence can cause the barcode on the item to appear motionless to the barcode scanner 115 even while the item is in motion.

Figure 2A:
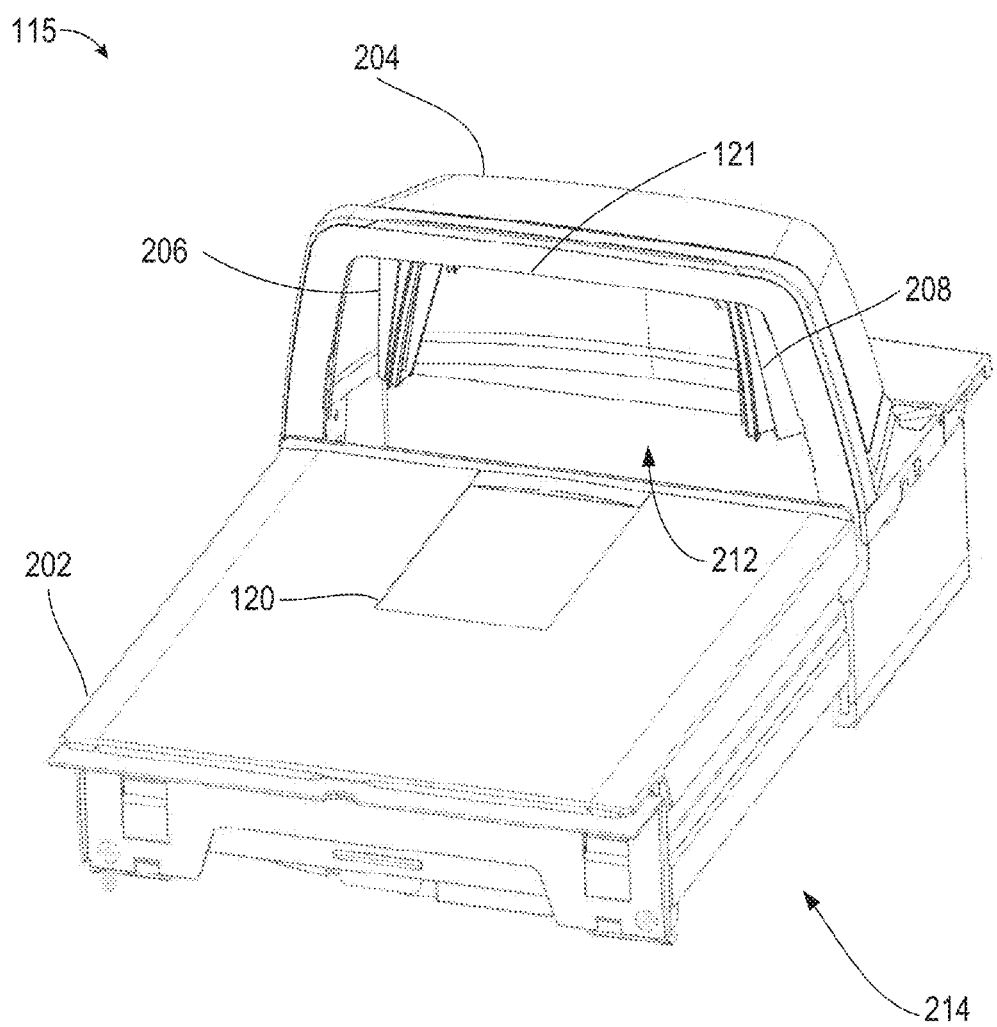
FIGS. 2A and 2B show a barcode scanner according to an example embodiment.
Figure 2B:
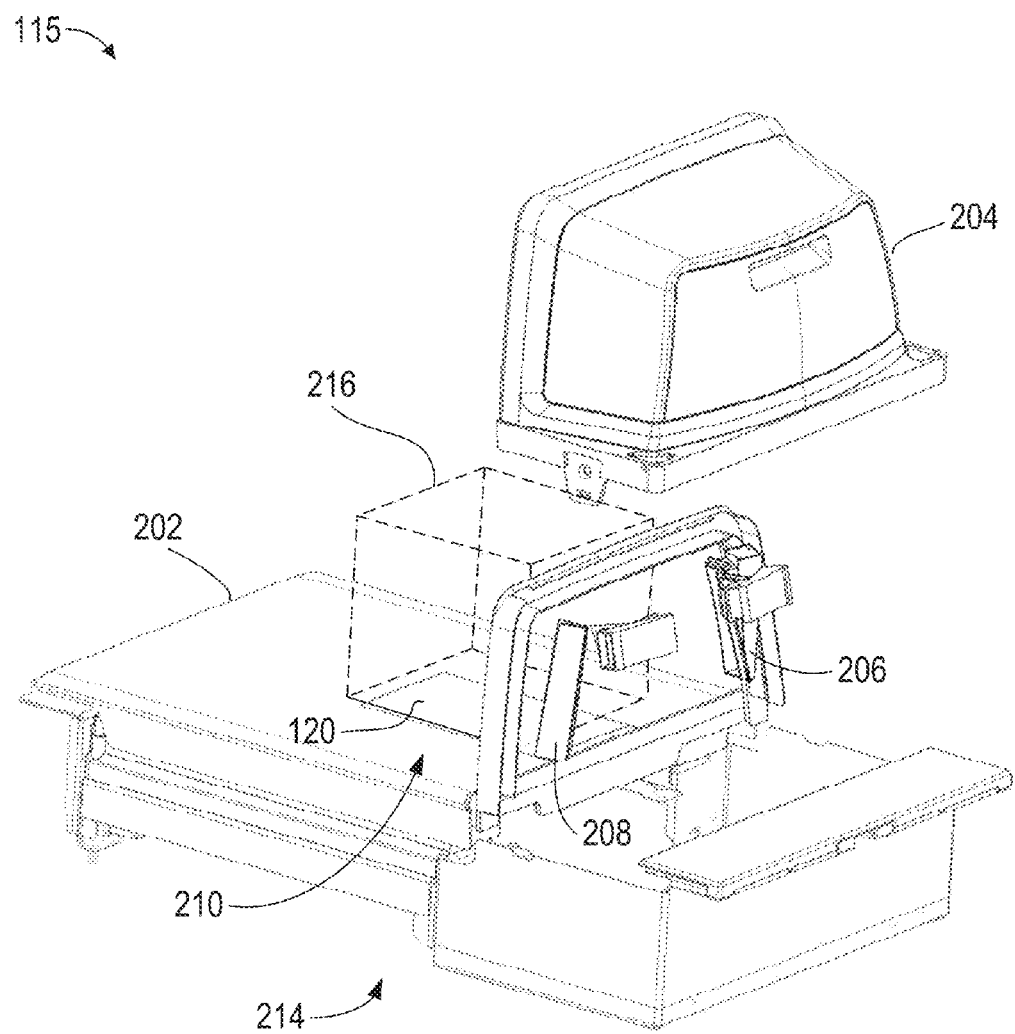

Turning now to FIGS. 2A and 2B, FIGS. 2A and 2B show the barcode scanner 115 according to an example embodiment. The barcode scanner 115 can include a top plate 202, a scanning tower 204, a first illumination source 206, a second illumination source 208, a first scanner 210, and a second scanner 212. In addition, the barcode scanner 115 can include more illumination source and scanning sources than are shown in FIGS. 2A and 2B. The top plate 202 can define the first scanning window 120. The scanning tower 204 can define the second scanning window 121. The second scanning window 121 can be arranged at an angle to the top plate 202. The top plate 202 and the scanning tower 204 can be attached to a base 214.

During use, a user can swipe items across the top plate 202 and the first illumination source 206 and the second illumination source 208 can project light across the top plate 202 in a strobe fashion. The light can be focused into a volume 216 with which the barcode can travel and be seen by the various scanners. The strobe light can cause a barcode attached to an item in motion proximate the first scanning window 120 and the second scanning window 121 to appear motionless to the first scanner 210 and the second scanner 212.

Figure 3:
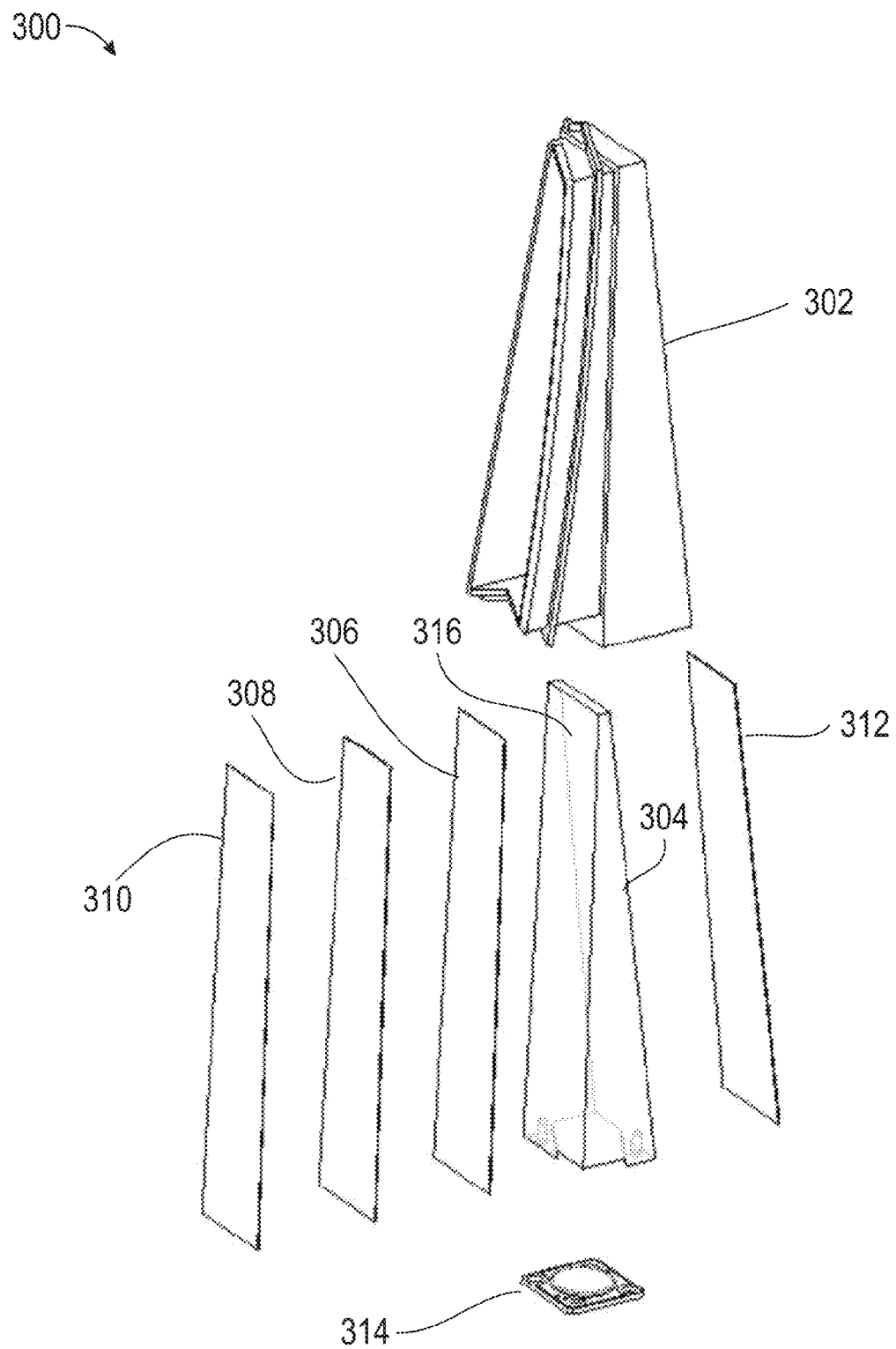
FIG. 3 shows an illumination source according to an example embodiment.

FIG. 3 shows an illumination source 300 according to an example embodiment. The illumination source 300 can be the first illumination source 206 or the second illumination source 208. As shown in FIG. 3, the illumination source 300 can include a housing 302, a reflector 304, a first film 306, a second film 308, a diffuser 310, a backing 312, and a light emitting diode (LED) 314. The reflector 304 can be sized to fit within the housing 302. The first film 306, the second film 308, and the diffuser 310 can connect to the housing 302 or the reflector 304.

The reflector 304 can include a reflective surface 316. The reflective surface 316 can be used to redirect light generated by the LED 314. For example, the light generated by the LED 314 can travel in a first direction. The first direction can be, for example, parallel to the first scanning window 121 or perpendicular to the top plate 202. The reflective surface 316 can redirect the light generated by the LED 314 in a second direction. For instance, the second direction can be, for example, perpendicular to the scanning window 121 or parallel to the top plate 202. Stated another way, the reflective surface 316 can redirect the light generated the LED 314 so as to illuminate the area above the first scanning window 120 and near the second scanning window 121.

The first film 306 and the second film 308 can be used to generate collimated light. For example, the first film 306 can be used to create a vertically oriented light and the second film 308 can be used to create a horizontally oriented light. By having the vertically and horizontally oriented light, errant light can be reduced. By reducing the errant light, eyestrain and other fatigue caused by the light can be minimized.

The first film 306 and the second film 308 can be brightness enhancing films, one vertically oriented and one horizontally oriented. The first film 306 and the second film 308 can reject light back into the scanning tower 204 that does not exit at a specific angle, such as 90 degrees, to the first scanning window 121. This serves to collimate the light.

The films can also be arranged parallel to the second scanning window 121. For example, the illumination source 300 can be located within the scanning tower 204. The films 306 and 308 and the lens 310 can be arranged such that the films 306 and 308 and the lens 310 are parallel to the first scanning window 121 or perpendicular to the top plate 202.

The diffuser 310 can be placed over the films to protect the films and to further diffuse the light to further reduce eyestrain and other fatigue. For example, the diffuser 310 can protect the films from scratches, cracks, etc. as well as protect against dust. In addition, the diffuser 310 and one or more of the films can be combined. For example, a first side of the lens 310 can have a first coating and a second side of the lens 310 can have a second coating.

The LED 314 can be a chip on board LED that emits light in a strobe sequence. The strobe sequence can range from about 60 Hz to about 250 Hz. For example, the LED 314 can emit light with a brightness of about 1200 lumens at 80 Hz. Using the LED 314 and the reflector 304 can be used to eliminate LED hotspots. When assembled, the LED 314 can be secured to the base 214 or to the housing 302 via screws or adhesives. Stated another way, as disclosed herein, a high intensity point light source to be spread out uniformly in a small package.

The housing 302 can be connected to the base 214 or to the scanning tower 204. For example, the housing 302 can include a groove 320 or other structure that can be used to attach the housing to the scanning tower 204. In addition, the screws can pass through a portion of the base 214 and the LED 314 into the housing 302.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A barcode scanner comprising:
   a scanning tower defining a scanning window having a first vertical side and a second vertical side;
   a first housing located within the scanning tower and proximate the first vertical side of the scanning window;
   a second housing located within the scanning tower and proximate the second vertical side of the scanning window;
   a first illumination source connected to a bottom portion of the first housing;
   a second illumination source connected to a bottom portion of the second housing;
   a first reflector located within the first housing and proximate the first illumination source, the first reflector configured to redirect light into a scanning volume; and
   a second reflector located within the second housing and proximate the second illumination source, the second reflector configured to redirect light into the scanning volume.

2. The barcode scanner of claim 1, wherein redirecting the light includes redirecting the light parallel to a top plate located proximate the scanning tower and beneath the scanning volume.

3. The barcode scanner of claim 1, further comprising:
   a first film arranged parallel to the scanning window and connected to the first housing; and
   a second film arranged parallel to the scanning window and connected to the second housing.

4. The barcode scanner of claim 3, further comprising:
   a third film arranged parallel to the first film, the first film and the third film creating a first collimated light; and
   a fourth film arranged parallel to the second film, the third film and the fourth film creating a second collimated light.

5. The barcode scanner of claim 1, further comprising a chip on board light emitting diode configured to generate the light, the light having a strobe sequence.

6. The barcode scanner of claim 5, wherein the strobe sequence ranges from about 80 Hz to about 250 Hz.

7. A barcode scanner comprising:
   a top plate having a surface, the surface defining a first scanning window;
   a scanning tower, the scanning tower defining a second scanning window arranged at an angle to the top plate, the second scanning window having a first vertical edge and a second vertical edge;
   a first housing located within the scanning tower and proximate the first vertical edge of the second scanning window, the first housing including a first reflective surface arranged to redirect light traveling in a first direction to a second direction, the second direction being through the second scanning window and towards the first scanning window;
   a second housing located within the scanning tower and proximate the second vertical edge of the second scanning window, the second housing including a second reflective surface arranged to redirect light traveling in the direction to the second direction;

a first illumination source located adjacent the first reflective surface and connected to the first housing at a bottom portion of the first housing, the first illumination source for creating the light traveling in the first direction; and a second illumination source located adjacent the second reflective surface and connected to the second housing at a bottom portion of the second housing, the second illumination source for creating the light traveling in the first direction.

8. The barcode scanner of claim 7, wherein the first direction is perpendicular to the top plate.

9. The barcode scanner of claim 7, further comprising:
a third film arranged parallel to the first film, the first film and the third film creating a first collimated light traveling in the second direction; and
a fourth film arranged parallel to the second film, the second film and the fourth film creating a second collimated light traveling in the second direction.

10. The barcode scanner of claim 7, wherein the first illumination source has a strobe sequence that ranges from about 80 Hz to about 250 Hz.

11. The barcode scanner of claim 7, wherein the illumination source includes a chip on board light emitting diode.

12. A service terminal comprising:
a first scanner;
a top plate having a surface, the surface defining a first scanning window located above the first scanner;
a second scanner located within a scanning tower, the scanning tower defining a second scanning window arranged at an angle to the top plate, the second scanning window having a first vertical edge and a second vertical edge;
a first light source;
a second light source;
a first housing located within the scanning tower and adjacent the first vertical edge of the second scanning window, the first housing connected to the first light source and including a first reflective element in contact three interior sides of the first housing, the first light source connected to a bottom portion of the first housing and operable to emit light in a first direction, the first reflective element arranged to redirect the light traveling in the first direction to a second direction, the second direction being through the second scanning window and towards the first scanning window; and
a sound housing located within the scanning tower and adjacent the second vertical edge of the second scanning window, the second housing connected to the second light source and including a second reflective element in contact three interior sides of the second housing, the second light source connected to a bottom of the second housing and operable to emit light in the first direction, the second reflective surface arranged to redirect the light traveling in the first direction to the second direction.

13. The barcode scanner of claim 12, wherein the first direction is perpendicular to the top plate.

14. The barcode scanner of claim 12, further comprising:
a first film arranged perpendicular to the second direction and connected to the first housing; and
a second film arranged perpendicular to the second direction and connected to the second housing.

15. The barcode scanner of claim 14, further comprising:
a third film arranged parallel to the first film, the first film and the third film creating a first collimated light traveling in the second direction; and
a fourth film arranged parallel to the second film, the second film and the fourth film creating a second collimated light traveling in the second direction.

16. The barcode scanner of claim 12, wherein the first light source and the second light source each includes a chip on board light emitting diode and the light is emitted in a strobe sequence that ranges from about 80 Hz to about 120 Hz.

* * * * *